US008170868B2

(12) United States Patent (10) Patent No.: US 8,170,868 B2
Gamon et al. (45) Date of Patent: May 1, 2012

(54) EXTRACTING LEXICAL FEATURES FOR CLASSIFYING NATIVE AND NON-NATIVE LANGUAGE USAGE STYLE

(75) Inventors: Michael Gamon, Seattle, WA (US); William B. Dolan, Kirkland, WA (US); Christopher Brockett, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1573 days.

(21) Appl. No.: 11/375,167

(22) Filed: Mar. 14, 2006

(65) Prior Publication Data
US 2007/0219776 A1 Sep. 20, 2007

(51) Int. Cl.
G06F 17/27 (2006.01)
G06F 17/20 (2006.01)
(52) U.S. Cl. .................................. 704/9; 704/1; 704/8
(58) Field of Classification Search .................. None
See application file for complete search history.

(56) References Cited

U.S. PATENT DOCUMENTS

| | | | | |
|---|---|---|---|---|
| 5,237,502 A | * | 8/1993 | White et al. ..................... | 704/1 |
| 5,864,810 A | * | 1/1999 | Digalakis et al. ............. | 704/255 |
| 5,878,385 A | * | 3/1999 | Bralich et al. ................... | 704/9 |
| 5,983,170 A | * | 11/1999 | Goodman ......................... | 704/9 |
| 6,853,962 B2 | * | 2/2005 | Appleby .......................... | 703/2 |
| 6,963,836 B2 | * | 11/2005 | Van Gestel ..................... | 704/251 |
| 7,505,906 B2 | * | 3/2009 | Lewis et al. .................... | 704/246 |
| 2004/0215445 A1 | * | 10/2004 | Kojima ............................. | 704/9 |

OTHER PUBLICATIONS

Yu, Bei. Comparative Literary Style Mining between Native and Non-native English Writers. in ASIS&T, 2004.*
Abney, Stephen P. Parsing by Chunks. In Berwick, Abney, and Tenny, editors, Principle-Based Parsing. Kluwer Academic Publishers, 1994.*
Putnins et al. Advanced Text Authorship Detection Methods and their Application to Biblical Texts. Proceedings of SPIE 2005.*
Yu et al. "English Usage Comparison between Native and non-Native English Speakers in Academic Writing". ACH/ALLC Conf, Jun. 15-18, 2005.*
Corney et al. "Identifying the Authors of Suspect Email". Computers and Security, in press, 2001.*
Tomokiyo et al. "Recognizing Non-Native Speech: Characterizing and Adapting to Non-Native Usage in LVCSR". PhD Thesis, Carnegie Mellon University, 2001. pp. 119-140.*
Leah S. Larkey and W. Bruce Croft, "A Text Categorization Approach to Automated Essay Grading", 16 pages, 2003; in *Automated Essay Scoring: A Cross-Disciplinary Perspective*, Mark D. Shermis and Jill C. Burstein, eds.
Shlomo Argamon-Engelson, Moshe Koppel, and Galit Avneri, "Style-Based Categorization: What Newspaper am I Reading?", 4 pages, 1998; in *Proceedings of AAAI Workshop on Learning for Text Categorization*.

(Continued)

*Primary Examiner* — Talivaldis Ivars Smits
*Assistant Examiner* — Jesse Pullias
(74) *Attorney, Agent, or Firm* — Westman, Champlin & Kelly, P.A.

(57) ABSTRACT

A corpus is provided of language usage by non-native users of the language. Characteristics of the corpus are measured and used to create a language usage classifier for indicating non-native usage of the language. Once the language usage classifier is created, a natural language input may be entered, and the characteristics thereof measured. These characteristics are then compared with the indicators of non-native usage, thereby detecting non-native usage. The evaluation of non-native usage may be used as a versatile foundation to enhance a wide variety of tools and applications dealing with user interaction in languages other than their native language.

20 Claims, 8 Drawing Sheets

OTHER PUBLICATIONS

Harald Baayen, Hans van Halteren, and Fiona Tweedie, "Outside the Cave of Shadows: Using Syntactic Annotation to Enhance Authorship Attribution", 7 pages, 1996; in Literary and Linguistic Computing, vol. 11, No. 3, p. 121.

Moshe Koppe, Navot Akiva and Ido Dagan, "A Corpus-Independent Feature Set for Style-Based Text Categorization," 7 pages, 2003; in *IJCAI—2003 Workshop on Computational Approaches to Text Style and Synthesis*.

Marina Santini, "A Shallow Approach to Syntactic Feature Extraction for Genre Classification," 8 pages, 2003; in Literary and Linguistic Computing, vol. 17, No. 4, p. 401.

Moshe Koppel, Shlomo Argamon and Anat Rcahel Shimoni, "Automatically Categorizing Written Texts by Author Gender," 13 pages, 2002; in *Proceedings of the 7th Annual Colloquium for the UK Special Interest Group for Computational Linguistics*.

* cited by examiner

EXTRACTING LEXICAL FEATURES FOR CLASSIFYING NATIVE AND NON-NATIVE LANGUAGE USAGE STYLE

BACKGROUND

Applications, interfaces, and Internet sites are often provided in a single language or with a small group of languages to choose from. They are frequently used by people with a different native language, who must use the application, interface, or Internet site in a language that is not native to them and in which they may not be fluent. This is increasingly true as computer and Internet usage continues to increase in all parts of the world. For example, a great deal of Internet content and applications are provided in English and are used by non-native English speakers to post content, to use an application, or to communicate in a business environment.

The discussion above is merely provided for general background information and is not intended to be used as an aid in determining the scope of the claimed subject matter.

SUMMARY

New systems, methods, tools, and interfaces have been created that recognize non-native usage of a language, and respond in ways that improve the usefulness of a tool or interface for either a non-native language user or a native language user. A language usage classifier is provided which may serve as a versatile foundation for a wide variety of tools and applications dealing with user interaction in languages other than their native language, according to a variety of embodiments. A method is provided for measuring characteristics of a corpus of inputs by non-native users of a language, and using the characteristics to create a classifier for indicating non-native usage of the language. A classifier may be used to receive a natural language input, measure characteristics of the input, and compare the characteristics of the input with indicators of non-native usage, thereby detecting non-native usage. It may also classify an input as native-like or non-native-like, and make that classification available to provide solutions in a wide variety of applications that are based on the classification. For example, text analysis and grammar checker tools may provide solutions customized to address the kinds of errors typical of non-native users, in one embodiment.

The Summary and Abstract are provided to introduce a selection of concepts in a simplified form that are further described below in the Detailed Description. The Summary and Abstract are not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Non-native users of a language are likely to make errors of usage that are identifiably different compared with errors that are typical of native users of the language. That difference between the average or typical body of errors likely to be made by non-native users as opposed to native users has been found to be generally classifiable. This may be similarly applicable across a broad range of native languages and second languages.

Methods and applications to fulfill such a function may include training a machine to recognize usage typical of non-native users of a language, by measuring characteristics of a corpus of such non-native usage, according to an illustrative embodiment. Such characteristics can be used as indicators of non-native usage, to model a classifier for the non-native usage. This may be done with any language. Future inputs can then be compared against the classifier, and whether they correspond to the non-native classifier, or the degree to which they so correspond, can be detected and evaluated. This determination may then be used to customize output to be more effective for the user.

Figure 1:
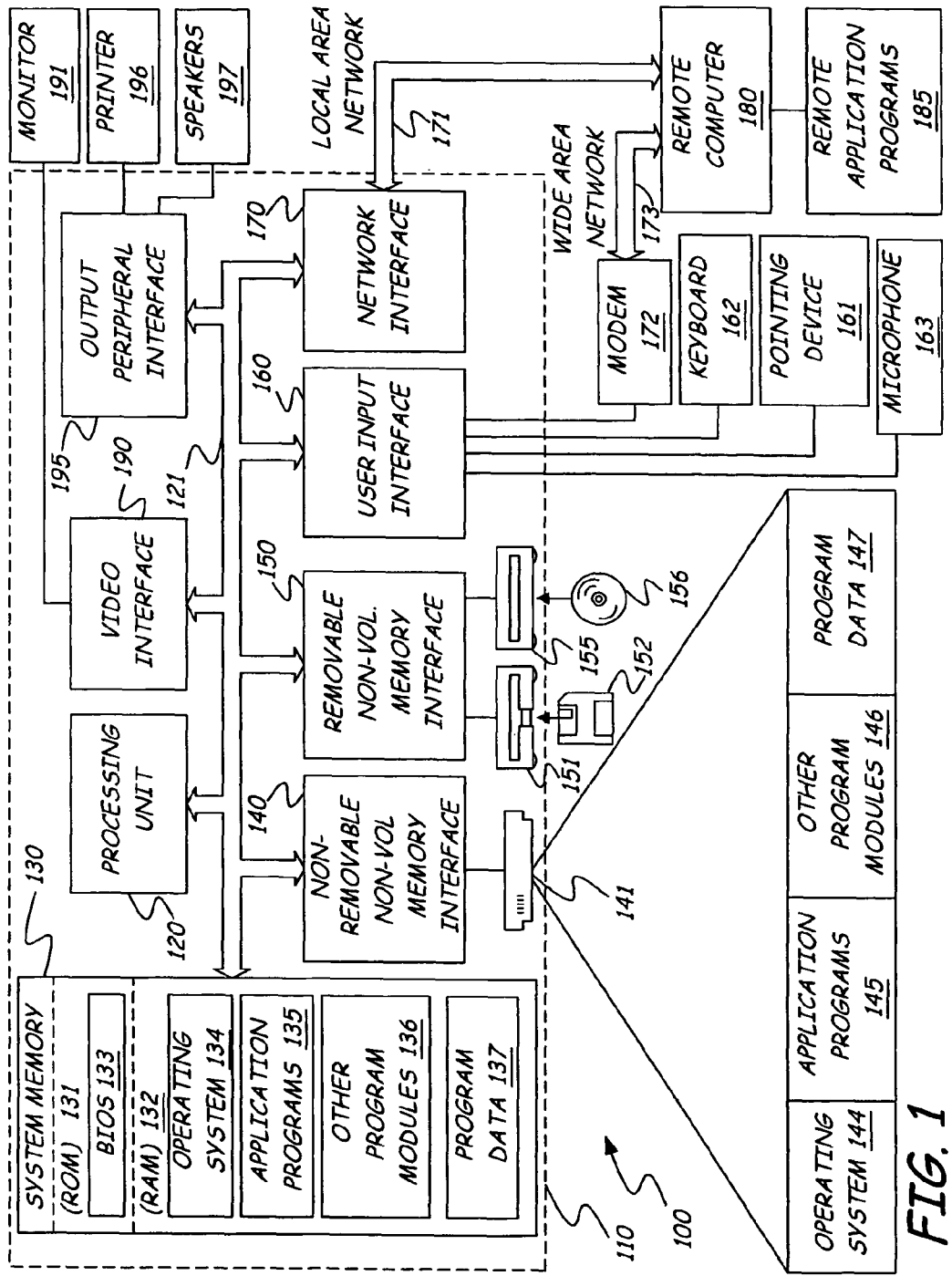
FIG. 1 depicts a block diagram of a general computing environment, according to one illustrative embodiment.

Prior to discussing particular aspects of present embodiments in greater detail, a few illustrative systems and environments with which various embodiments can be used are discussed. FIG. 1 depicts a block diagram of a general computing environment 100, comprising a computer 110 and various media such as system memory 130, nonvolatile magnetic disk 152, nonvolatile optical disk 156, and a medium of remote computer 180 hosting remote application programs 185, the various media being readable by the computer and comprising executable instructions that are executable by the computer, according to an illustrative embodiment. FIG. 1 illustrates an example of a suitable computing system environment 100 on which various embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Various embodiments may be implemented as instructions that are executable by a computing device, which can be embodied on any form of computer readable media discussed below. Various additional embodiments may be implemented as data structures or databases that may be accessed by various computing devices, and that may influence the function of such computing devices. Some embodiments are designed to be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may be operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
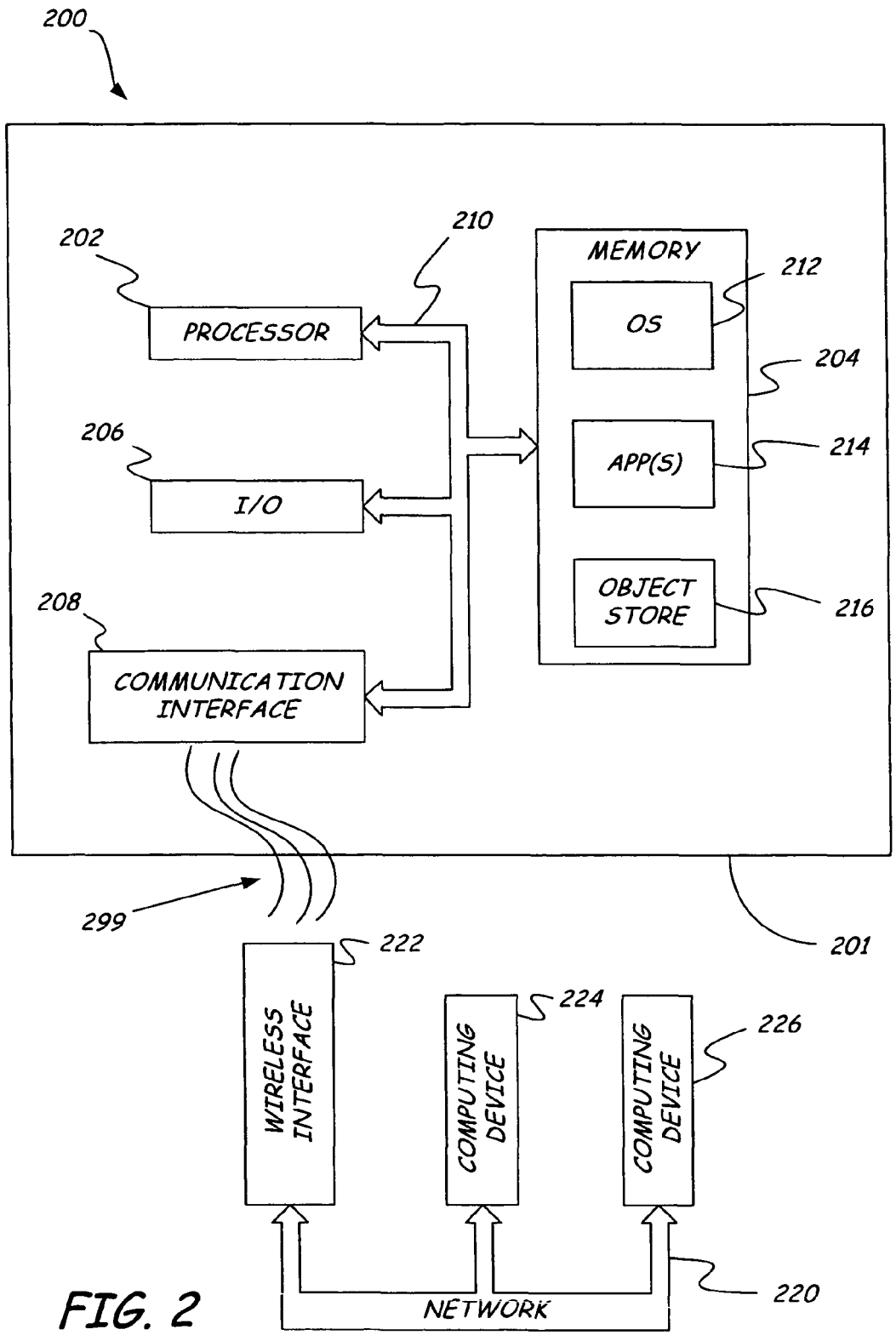
FIG. 2 depicts a block diagram of a general mobile computing environment, according to one illustrative embodiment.

FIG. 2 depicts a block diagram of a general mobile computing environment, comprising a mobile computing device and a medium, readable by the mobile computing device and comprising executable instructions that are executable by the mobile computing device, according to another illustrative embodiment. FIG. 2 depicts a block diagram of a mobile computing system 200 including mobile device 201, according to an illustrative embodiment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Mobile computing system 200 also includes network 220. Mobile computing device 201 is illustratively in wireless communication with network 220—which may for example be the Internet, or some scale of area network—by sending and receiving electromagnetic signals 299 of a suitable protocol between communication interface 208 and wireless interface 222. Wireless interface 222 may be a wireless hub or cellular antenna, for example, or any other signal interface. Wireless interface 222 in turn provides access via network 220 to a wide array of additional computing resources, illustratively represented by computing resources 224 and 226. Computing device 201 is enabled to make use of executable instructions stored on the media of memory component 204, such as executable instructions that enable computing device to create or access virtual worlds with semantically tagged objects according to various embodiments. For example, the executable instructions may enable mobile computing device 201 to receive input defining an object in a virtual setting, and associate a semantic annotation with the object, according to one illustrative embodiment.

Figure 3:
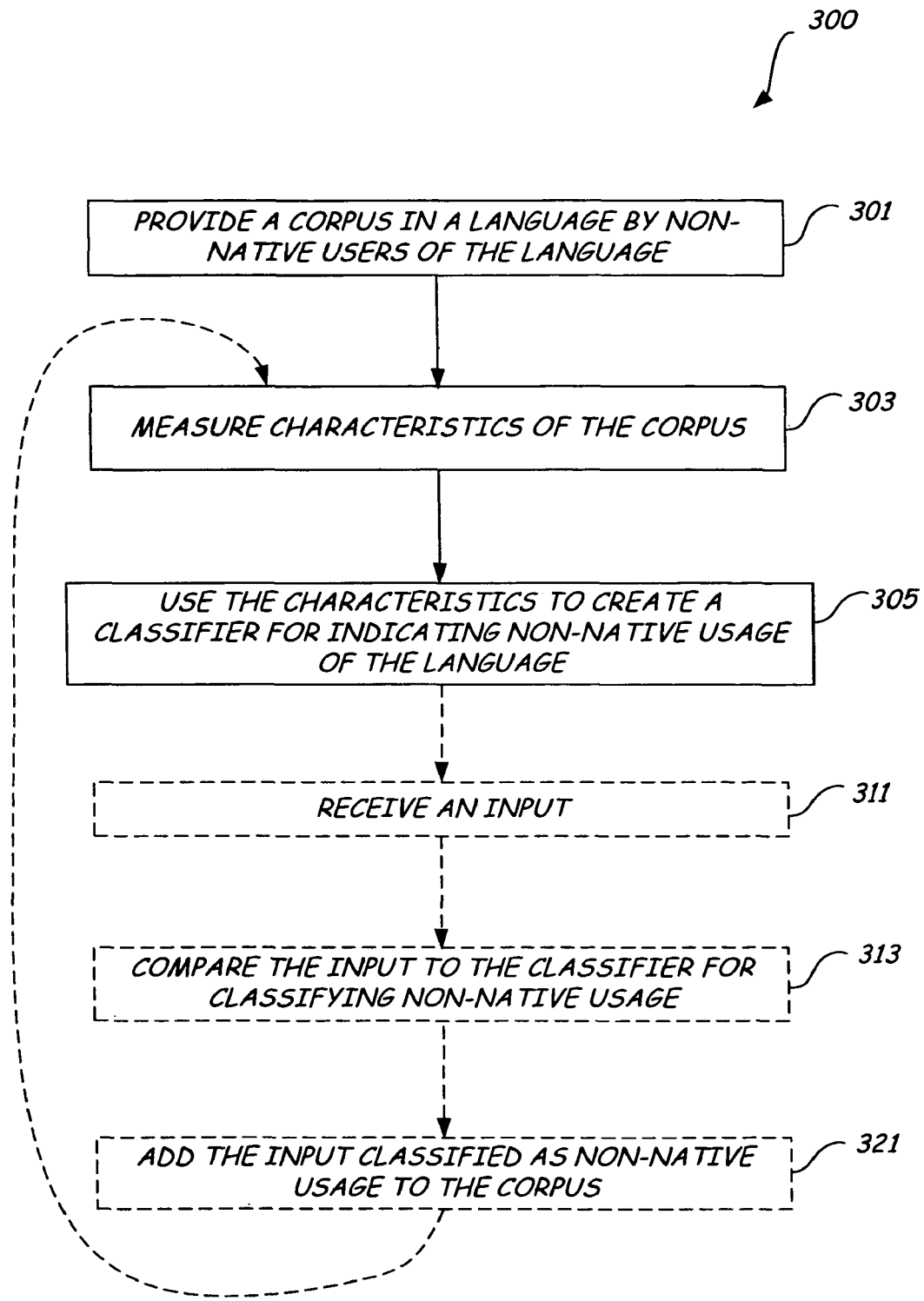
FIG. 3 depicts a flowchart of a method providing an illustrative embodiment of a language usage classifier.

FIG. 3 depicts a flowchart of a method 300 providing an illustrative embodiment of a language usage classifier. Method 300 is implementable at least in part by a computing device, such as computing devices 110, 180, 201, 224, and 226 of FIGS. 1 and 2. A language usage classifier could be embodied, for example, as a stand-alone application; as a dynamic-link library (DLL) file that other programs are linked to, so it can be used within the context of other programs; as a web-based application; as an object or a feature within a larger program; or as any of a variety of other possible embodiments.

FIG. 3 includes step 301, to provide a corpus in a language by non-native users of the language; step 303, to measure characteristics of the corpus; step 305, to use the characteristics to create a classifier for classifying non-native usage of the language; and other illustrative optional steps. These steps are elaborated below, and are described in further detail with reference to FIG. 4.

The corpus provided in step 301 may be large enough to present a statistically representative sample of non-native usage. For example, in one embodiment that has served as a prototype, a corpus of 80,000 sentences of non-native usage of the English language was used. A corpus that large is not required for various other embodiments, which could include a corpus with a small fraction of the number of sentences. A much larger corpus may also be used, with hundreds of thousands of sentences or more. The particular illustrative prototype corpus mentioned above was gathered from student essays written in English by native Mandarin Chinese speaking college students in Beijing. This is merely one example of an illustrative source for a non-native usage corpus, and any type of other source of non-native usage may also be used to assemble a corpus for step 301.

Any variety of characteristics of the corpus may be measured and used to automatically create a language usage classifier. This prevents the need to manually enter proposed distinguishing characteristics. Several specific examples of measurable characteristics are discussed further below.

Method 300 may also include optional step 311, to receive an input, and step 313, to compare the input to the classifier for classifying non-native usage. (Optional steps are indicated here by dashed lines.) The input received in step 311 may be gathered, or "scraped", from a network, such as the Internet, or a wide area network, for example. This input may be compared to the classifier for classifying non-native usage, as in step 313. This may be useful for filtering texts with non-native usage from texts with native usage, and collecting both native and non-native language samples. The language usage classifier can thereby be used to automatically collect native and non-native-type language samples from a network. The native language samples may be helpful in further modeling the native usage of the language, and for example may be used to screen for the quality of usage in a text.

Input classified as non-native usage, representing non-native-type language samples, may be added to the corpus, as in optional step 321. This method may allow a non-native usage corpus to be used as a basis for enlarging the sample size of the corpus, allowing the corpus to be "bootstrapped" into a larger corpus. This may then be followed by re-evaluating the corpus, including re-measuring the characteristics of the corpus, and storing the re-measured characteristics as a refined classifier for indicating non-native usage of the language. The new non-native usage material may therefore be used to refine the classifier. Because the initial corpus is already of a size considerable enough to include a broadly representative range of non-native usage, as described above, the additions to the corpus due to bootstrapping are able to refine the classifier without unduly magnifying the importance of particular examples of non-native usage from the original corpus.

Figure 4:
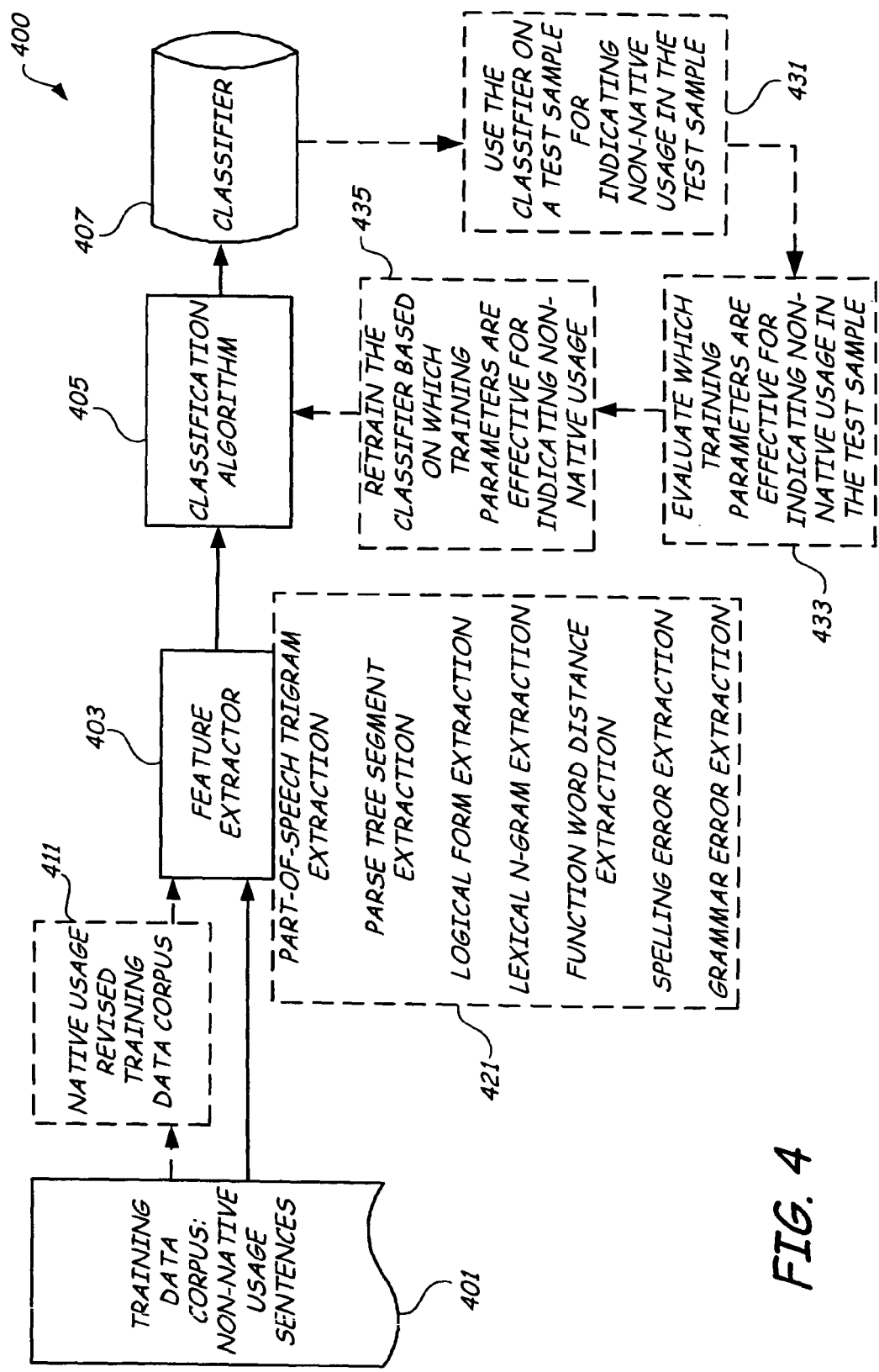
FIG. 4 depicts a block diagram of an architecture of a language usage classifier, according to one illustrative embodiment.

FIG. 4 depicts a block diagram of an architecture 400 corresponding in some respects to method 300, according to the present illustrative embodiment. Architecture 400 includes training data corpus 401, a corpus of training data comprising non-native-like sentences; feature extractor 403, which extracts, or processes and measures, features or characteristics of the training data corpus 401; and classification algorithm 405, which models the measured characteristics to create classifier 407. Classifier 407 is thereby trained to automatically detect text containing non-native-like properties of usage and errors typical of non-native language use, and distinguish non-native-type errors from native-type errors.

A system such as architecture 400 of FIG. 4, for receiving a set of sentences comprising non-native usage of a language, measuring features of the sentences, and using the measured features to define a classifier that models usage similar to the measured features, may be embodied as executable instructions stored on a medium, in one illustrative embodiment. Such executable instructions may be stored on a medium readable by a computing device, such as those embodied in FIGS. 1 and 2 as ROM 131, operating system 134, application programs 135, other program modules 136, program data 137, user input interface 160, remote application programs 185, operating system 212, applications 214, or object store 216, for example. Such executable instructions may be readable by a computing device, wherein the executable instructions enable a computing device to carry out the functions indicated for architecture 400 in FIG. 4, or to perform the method 300 of FIG. 3, for example.

Architecture 400 includes training data corpus 401, a corpus of training data comprising non-native usage sentences, or sentences exhibiting usage errors typical of non-fluent, non-native speakers of the language in which the sentences are written or spoken. The non-native-like training data corpus 401 may be modeled by itself as a basis for architecture 400, resulting in classifier 407 being a one-class classifier; or, the training data corpus 401 may also be used to compile a parallel native usage revised training data corpus 411, and both training data corpora may be modeled to create classifier 407 as a two-class classifier. The revised training data corpus 411 is described further below.

Architecture 400 further includes feature extractor 403, which extracts features of the non-native-like sentences. Feature extractor 403 corresponds to step 303 of measuring characteristics of the corpus; the features it extracts are characteristics that are processed and measured. The extracted features are stored and compiled as the basis used and modeled by classification algorithm 405 to assemble classifier 407, which incorporates a model of the non-native language usage based on the stored characteristics. The classifier 407 may then be used for indicating non-native usage of the language. Any new data that fit the model of non-native language usage of classifier 407 are classified as "in-class", or within the class modeled by classifier 407. New data indicated to be "in-class" are therefore classified as non-native usage. Data that do not fit the learned model of classifier 407 are classified as "out-of-class", or, in this case, as native-like usage, in this illustrative, one-class classifier embodiment.

A wide variety of characteristics of the training data corpus 401, representing a wide variety of stylistic and usage properties may be measured and stored by feature extractor 403. Some illustrative examples of these characteristics are indicated in feature extractor component 421, which is described further below. A large set of different characteristics may be measured for the same training data. Measuring characteristics and using them to model language usage prevents the need to manually define rules or patterns of non-native usage. Instead, the characteristics are automatically defined and modeled by architecture 400.

Classification algorithm 405 prepares an effective model for the sentences of the training data corpus 401 and encodes them into classifier 407, in this illustrative embodiment. Classification algorithm 405 may accomplish this by computing a model of a set of measured characteristics corresponding to each sentence, with quantified values representing the incidence of those characteristics, for example. This collection of characteristics and/or values representing them may be represented in the form of feature vectors. Each feature vector from the training data corpus 401 may be passed into the classification algorithm 405 to contribute to specifying the classifier 407.

One way in which classification algorithm 405 may prepare classifier 407 is by using a support vector machine (SVM), in this illustrative embodiment. An SVM is an automated learning system based on statistical learning theory. In the present illustrative embodiment, the SVM uses a kernel function to model properties of data, which have been measured by feature extractor 403. A radial basis kernel function is one particular option that may be used in the present embodiment, though any of a variety of other kernel functions may also be used. Those skilled in the arts related to Machine Learning and Natural Language Processing will appreciate the usefulness of support vector machines and a wide variety of other options in the context of these and other embodiments.

An SVM is well-suited for modeling the characteristics of training data corpus 401 to create classifier 407, and using classifier 407 to evaluate later inputs. This may include making a binary distinction of whether the later data does or does not fall into the category defined by the modeled characteristics, in an embodiment of a one-class classifier. Classifier 407 may then indicate the result of that distinction, corresponding in this case to an indication of non-native usage if the new data falls into the modeled category, or native usage if the new data falls outside the modeled category.

In a two-class classifier embodiment, an SVM may be used to model the distinction between one class, a class of non-native usage, based on non-native usage training data corpus 401, and a second class, a class of native usage, based on native usage revised training data corpus 411. In an illustrative embodiment, revised training data corpus 411 is derived by revising the non-native usage training data corpus 401 into sentences conforming to native usage, by experts or other native users of the language. Revised training data corpus 411 would then provide a parallel data set for direct comparison between characteristics of non-native usage and characteristics of corresponding native usage.

The native-like sentences may also be fed into feature extractor 403, which may measure characteristics of both the non-native-like training data corpus 401 and the native-like data set produced with revised training data corpus 411. This may allow the training of classifier 407 as a two-class classifier, rather than a one-class classifier, in this illustrative embodiment. A single model is obtained for the distinction between the non-native-like and the native-like corpora, thereby providing a basis for later inputs to be evaluated for falling into the category of non-native-like or native-like language usage. Classifier 407 may then make, in one example, a binary distinction between whether a later set of data corresponds more closely to the non-native usage class or to the native usage class, or provide a degree to which an input corresponds both to non-native usage and to native usage.

Many other optional embodiments may be used for classifier algorithm 405, including other types of one-class, two-class, and multi-class classifier algorithms. SVM algorithms and other methods of machine learning are the subject of ongoing progress, and the usefulness of both current and future machine learning methods for the present illustrative embodiments will be appreciated by those skilled in the art.

While the example of a corpus of English writing by native Mandarin Chinese speakers was mentioned above, corpora of non-native usage of any subject language by native speakers of any other language may be equally suitable for training various additional classifiers or classifier modes corresponding to classifier 407 of architecture 400. In another illustrative embodiment, in addition to a corpus of English sentences written by native Mandarin Chinese speakers, additional corpora may also be gathered consisting of English sentences written by native speakers of Japanese, Cantonese, Hindi, Spanish, French, and German, as just a few illustrative examples. These sources may be used, singly or together, in the training data corpus 401 to train a single classifier 407, in various illustrative embodiments.

In other illustrative embodiments, classifier 407 may include a variety of modes, or be accompanied by one or more parallel classifiers, for providing an added feature: indicating not only the presence or absence of non-native usage, but also the likely native language of the sources of the non-native usage, based on different characteristic non-native usage indicators exhibited by speakers of different native languages using the subject language of the corpus. This feature is further elaborated below, with reference to FIG. 5.

Similarly, in still other embodiments, corpora may also be gathered of Chinese sentences written by native speakers of English, Japanese, Hindi, Spanish, French, and German; or of French sentences written by native speakers of English, Mandarin Chinese, Cantonese, Japanese, Hindi, Spanish, and German; and corpora of any other languages written by native speakers of any other languages. Classifiers may be trained on any of these corpora to indicate non-native usage of the subject language of the corpus, and potentially also to indicate the likely native language of the sources of the corpus, in various embodiments. Indicators in the user's inputs of a particular language that is potentially the native language of the user may include grammatical usages peculiar to the potential native language that are imported into the subject language of the corpus, or occasional conjugations or even words from the potential native language being imported into the subject language of the corpus, for example. Prosody and intonation may also be good indicators of particular potential native languages; for example, a Japanese speaker speaking in English may intersperse words with "ano . . . " or "eeto" in the same way a native English speaker might instead use "um . . . ". This could serve as an indicator that the English language inputs are being made by a native Japanese speaker. Additional examples are discussed below.

Such indicators of various particular potential native languages may be derived automatically from the measured characteristics of a variety of training corpora, each taken from users of a single native language. A classifier may be trained on corpora derived from sources speaking a range of native languages, and may be trained to compare a later input to usage indicators of the range of native languages to evaluate whether the non-native usage indicators of the input match particularly well with the signature usage indicators of one of the corpus source native languages. As another option, some or all of the indicators for distinguishing likely native languages may be entered manually. For example, in one illustrative embodiment, a small set of manually entered native language indicators may be used together with indicators automatically modeled from measured characteristics of the different corpora.

Another illustrative embodiment may also distinguish not only between different native languages, but different variants or dialects of a single language. For example, it may distinguish between users of American English, standard British English, or particular usages of English characteristic of India, Singapore, or Hong Kong, for example. The methods disclosed herein may be equally suitable for any set of languages or language variants.

Feature extractor component 421 indicates several examples of optional feature extraction modes that may be applied by feature extractor 403, to measure various characteristics of the training data corpus 401, the native-like revised corpus provided via revised training data corpus 411, or another source of input. Some examples of the various characteristics that may be measured, as depicted in feature extractor component 421, include: part-of-speech trigrams, parse tree segments, logical forms, lexical N-gram features, function word distances, spelling errors, and grammar errors. Various tools of natural language processing (NLP), such as a part-of-speech tagger, a parser, a chunker, and so forth, and other existing and future NLP tools, may be used on training data corpus 401 as a processing step of feature extractor 403, providing measurable characteristics such as some of those listed above. Many other features, including virtually any measurable characteristics of a language sample, may also be measured and contributed to the classification algorithm 405 and/or the classifier 407. A wide variety of features is desired in many embodiments, because it has been found that even when several features are already used, the performance of classifier 407 may be further improved by considering still more features, due to the high complexity of the challenges involved in evaluating language usage.

Part-of-speech trigrams are sequences of three part-of-speech labels. Part-of-speech labels are often tagged to words in a sample as an early stage of natural language processing. As an example, the phrase "winter is cold" may be part-of-speech tagged as "winter/n is/v cold/a", where "/n" represents a tag indicating a noun part-of-speech, "/v" represents a tag indicating a verb part-of-speech, and "/a" represents a tag indicating an adjective part-of-speech. The part-of-speech trigram for the phrase above is therefore n-v-a. Patterns and proportions of part-of-speech trigrams may be measured in a corpus of non-native usage. Similar, or significantly different, patterns and proportions of part-of-speech trigrams may then be found either in a native usage revised corpus, or in a later sample of native usage, and these differences can serve as indicators of non-native or native usage.

Part-of-speech tags can be fairly narrow and represent a substantial amount of information about the tagged words. Different sets of part-of-speech tags may also be used for different corpus languages. For example, in one illustrative part-of-speech tagging scheme, part-of-speech tags may include "v" for verb, "a" for adjective, "d" for adverb, "n" for noun, "r" for pronoun, "m" for numeral, "e" for exclamation, "y" for interjection, "l" for idiom, "i" for idiomatic phrase, "p" for preposition, "c" for conjunction, "o" for onomatopoeia, and so forth. Another illustrative part-of-speech tagging scheme may include tags customized for parts of speech that occur in a particular language, for example, such as "q" for a measure word, a part-of-speech that occurs in Chinese, Japanese, Korean, and several other Asian languages, but not in English or other widespread European languages. Yet another illustrative part-of-speech tagging scheme may use more detailed part-of-speech tags to provide richer, more finely tuned information. For example, rather than only using "n" to tag any noun, it may use "nr" for a person name, "ns" for a location name, "nt" for an organization name, "nz" for another proper name, and so forth. The foregoing examples are merely illustrative, and any other consistent part-of-speech tagging scheme may also be used in other embodiments.

Another type of measurable characteristic in some embodiments, depicted in feature extractor component 421, is a parse tree segment. A parser may be used to convert a sentence into a parse tree representation. For each node in a parse tree, the label for the node and the labels of the daughter nodes of that node may be extracted. For example, a parse tree may include a node with a label of DECL, indicating a declarative sentence, and with daughter nodes labeled with the chunk types NP VERB NP, indicating that the declarative sentence consists of a noun phrase, a verb, and a second noun phrase. These labels may be added to a sentence from a corpus after the corpus has been chunked and parsed, in the present illustrative embodiment. For example, in one illustrative parsing scheme, an original sentence from a training corpus may read, "The wide area network includes a sophisticated security feature." This sentence may be chunked as "[NP The wide area network] [VERB includes] [NP a sophisticated security feature]", where "The wide area network" has been chunked as an NP, or noun phrase; "includes" has been chunked as a VERB; and "a sophisticated security feature" has been chunked as another NP, or noun phrase.

In this illustrative parsing scheme, a parsing process has then labeled the sentence as DECL, or a declarative sentence, and has assigned the sentence a corresponding node, and assigned the chunks corresponding daughter nodes. Feature extractor 403 may then store the segment "DECL::NP VERB NP" as one parse tree segment including the labels for a node and its daughter nodes, and may similarly store corresponding parse tree segments corresponding to each of the other sentences from a training data corpus 401. A daughter node within a sentence representation may also have daughter nodes of its own in a parse tree. For example, a clause within a sentence may feature a verb phrase that immediately dominates a verb and a noun phrase. This may be represented as VP::VERB NP, within a larger parse tree for the entire sentence. The particular chunking and parsing labels referred to here are illustrative of one embodiment, and any other consistent labeling scheme for chunking and parsing may be used in other embodiments. Relative similarities and differences between patterns and proportions of parse tree segments, compared with those of the baseline training data corpus 401, may then be found either in a native usage revised training data corpus 411, or in a later language sample, and these differences can serve as indicators of non-native or native usage, in this illustrative embodiment.

Another measurable type of feature in some embodiments, as indicated in feature extractor component 421, includes features based on the logical form graphs of the sentences. These logical form graphs may result from semantic analysis of the training data, and may include, for example, semantic relations of parts of speech; semantic features on a part of speech in a semantic relation; or the presence of a semantic feature. To use one illustrative semantic relation labeling scheme, one illustrative example of a semantic relation of parts of speech is the logical form graph "Verb Tsub Noun", indicating that a noun is in the semantic subject relation to a verb. An illustrative example of a semantic feature on a part of speech in a semantic relation is the logical form graph "Sing Noun Tsub", indicating a singular noun being in a semantic subject relationship. An illustrative example of the presence of a semantic feature is "Pres", indicating the presence of the semantic feature for present tense. Other detailed features of semantic relationships such as definiteness or indefiniteness may also be extracted. As with other extractable features, relative similarities and differences between patterns and proportions of logical form graphs, compared with those of the baseline training data corpus 401, may be found either in a native usage revised training data corpus 411, or in a later language sample, and these differences can serve as indicators of non-native or native usage. While a particular labeling scheme is referred to here, any other consistent labeling scheme for semantic relations and logical form graphs may be used in other embodiments.

Still another measurable type of feature in some embodiments, as indicated in feature extractor component 421, includes lexical N-gram features, where N may have a range of different numbers within the same embodiment, and different embodiments having different ranges of N. For example, in one illustrative embodiment, lexical N-gram features are extracted with N ranging from 1 to 3. An example might be a three-word sequence, such as " . . . little time to . . . " extracted from within a sentence. Any consistent labeling scheme may be used in different embodiments to represent lexical N-gram features in sentences such as this. To use one illustrative labeling scheme, this three-word sequence may be extracted and stored as a lexical trigram— that is, a lexical N-gram with N=3—as "ng_3_little-$$time$$to", where "ng" indicates a lexical N-gram, "3" indicates the numeral of N for this lexical N-gram, and "$$" stands for each space between adjacent words. One-gram and diagram features from the same sequence may also be measured, such as "ng_1_time", and "ng_2_time$$to". A variety of different characteristic lexical N-grams may be measured in non-native usage that are rarely or never measured in native usage samples, and vice versa, so that lexical N-gram features may be used for modeling classifier 407 and for indicating non-native usage of the subject language.

Yet another measurable type of feature in some embodiments, as indicated in feature extractor component 421, are function word distances. In an illustrative embodiment, a function word distance is the distance between function words, measured in the number of tokens from any function word in a sentence to any other function word in that sentence. Functional words, as opposed to lexical words, carry little meaning, and are used chiefly to grammatically modify the usage of lexical words. Functional words may therefore serve as significant indicators of native or non-native usage, as their proper usage is a function of the language user's mastery of sentence-level grammatical structure, which typically comes after entry-level elements of learning a language such as vocabulary and conjugation. Functional words include determiners, such as "the" and "a"; conjunctions, such as "and" and "but"; degree adverbs, such as "also" and "very"; and auxiliaries, such as "would" and "should". In an illustrative embodiment, a list of function words in the English language contains 349 words.

Non-native users of the subject language may be characteristically more likely to make errors with the function words, such as by leaving out determiners, using a wrong preposition, using a wrong modal verb or auxiliary verb, or omitting a modal verb or auxiliary verb. Furthermore, errors with function words may be one example of a measured characteristic that is particularly well-suited to detecting the native language of the users who generated the training data corpus, because of the substantial differences in the usage and even presence of different types of function words from one language to another. For example, Mandarin Chinese does not use determiners analogous to English "the" and "a", and native Mandarin Chinese speakers with an intermediate knowledge of English may be significantly more likely than native speakers of Spanish or French to make errors in the proper usage of determiners in a training data corpus of English usage that they generate, even if they are otherwise on a comparable level of English proficiency. As another example, most Western languages such as English, French and Spanish do not use the function words known as measure words and particles, and a training corpus of Mandarin Chinese language usage generated by native English speaking students of Mandarin may include significantly more errors in the usage of measure words than a training corpus of Mandarin usage generated by native speakers of languages that also use measure words, such as Japanese or Korean. So, the presence of other indicators of non-native usage of Chinese coupled with a number of errors in usage of measure words that is not particularly high compared with other indicators, may serve as an indicator that a Chinese text was written by a non-native Chinese speaker whose native language is probably Japanese, Korean, Thai, Vietnamese, Bengali, or another member of the subset of languages that use measure words.

In one illustrative embodiment, feature extractor 403 measures the distances between all possible pairs of function words in a given sentence. In this case, for example, a sentence with no or one function words would have no distance measured; a sentence with two function words would have a single distance measured; a sentence with three function words would have three distances measured; a sentence with four function words would have six distances measured, and so forth. A functional word distance may be stored in the format "fwpd_there$$its" with a value of 3, using one possible illustrative labeling scheme as described above, indicating that the two function words "there" and "its" are present in the sentence at a distance of three tokens.

In another illustrative embodiment, inflectional morphological markers may be lumped together with the function words and the distances between any two function words or inflectional morphological markers may be mapped. This may be appropriate in English, which has relatively little inflection. English has three inflectional morphological markers: "-ed", "-ing", and "-s". In still other embodiments, function word distances and inflectional morpheme distances may both be measured independently. This may be particularly helpful for embodiments directed to a corpus language with moderate inflectional complexity, such as Russian or Greek, or of very high inflectional complexity, such as Finnish, Telugu, or Tamil.

As feature extractor component 421 depicts, spelling errors and grammar errors may also be used for modeling classifier 407 and for indicating non-native usage of the subject language. Existing and hereafter developed spelling checkers and grammar checkers, such as those often incorporated in word processing applications, may interface compatibly with feature extractor 403, to detect and provide spelling and grammar errors in a training data corpus 401 and provide them for use in modeling classifier 407. Certain types of spelling and grammar errors may particularly stand out as characteristic of non-native usage, potentially also indicative of a particular native language of the non-native users of the training data language, making these significant characteristics for indicating non-native usage. Furthermore, any arbitrary set of measurable properties of a corpus may be measured by feature extractor 403 and used to model classifier 407, including results from any sort of NLP tool or other characterizer of the corpus. Even something as simple as word count per sentence, characters per word, misspellings of a particular type, the number of left and right transpositions, and so forth, may be used to train classifier 407, in different embodiments.

The corpus forming the training data corpus 401 can include virtually any form of language input. For example, it may include written text, spoken language, handwritten text, or other manifestations of language usage. As one illustrative embodiment using spoken language, a language usage classifier 407 may be used in association with an automatic speech recognition (ASR) tool, which translates spoken language inputs into text format. In another illustrative embodiment, the spoken language samples themselves may be subject to feature extraction and have characteristics, including audio characteristics, measured and used to specify the classifier 407. In yet another illustrative example using language inputs taking the form of handwriting samples, the language inputs may be written with a stylus on a monitor, and the characteristics measured may include graphical aspects of the handwriting samples.

Method 400 may also include optional steps 431, 433, and 435, for using a small test sample in addition to the larger corpus, and iteratively testing and refining the classifier 407 on the small test sample. Step 431 is for using the classifier 407 on a test sample for indicating non-native usage in the test sample. The test sample may have half native material and half non-native material, for example, in one embodiment. Step 433 is for evaluating which measured characteristics or parameter settings of the process of training classifier 407 are more effective for indicating non-native usage in the test sample. The test sample, including the native and non-native portions of the test sample if these are used, may be run through the classifier 407. The test samples may have previously been evaluated to a high degree of accuracy for their indicators of native and non-native usage, so they can serve as good measuring sticks against which to evaluate the accuracy and effectiveness of identification by the classifier 407, based on the measured characteristics or parameter settings it has used to measure the corpus, and how those measured characteristics or parameter settings have been used in classification algorithm 405 as the bases for testing native usage indicators versus non-native usage indicators.

For example, this method can be used for evaluating the effectiveness of different measures or different kernel functions, the relative weight given to any characteristic measured in the corpus, or any measure that can be varied in the training procedure, and measure the impact on the test set, and figure out which measures are more effective. The initial classifier 407 may serve as a default classifier, with a baseline set of parameters based on the characteristics measured by feature extractor 403, resulting from the operation of feature extractor 403 and classification algorithm 405 based on training data corpus 401, but previous to the operation of optional steps 431, 433, and 435. Then, steps 431, 433 and 435 are engaged, and a rating is provided for each of the characteristics measured by feature extractor 403, indicating how much correlation there is between a characteristic and the distinction between native and non-native. Similarly, the classification algorithm 405 may be customizable by various parameters, such as the cost for misclassification on the training set, etc.

The parameters of classifier 407 may then be tuned, as in step 435, for retraining the classifier 407 based on which measured characteristics or parameter settings of the classifier training process are more effective for indicating non-native usage. Classifier 407 may be retrained by varying parameter settings, such as by assigning greater weight to parameters based on successfully accurate characteristics, and by reducing the weight of or eliminating parameters based on characteristics that provided a lesser or negligible contribution to distinguishing between native and non-native usage. The classifier 407 can also be tuned by changing the parameters of the classification algorithm 405 and thus creating a new version of classifier 407 with different weights associated with individual characteristics. These examples are merely illustrative, and anything that can be changed in the training and/or application of the classifier may be used to optimize classifier 407, including training parameters, choice of features (i.e. measured characteristics), etc. The tuning of the assigned weights should be done moderately, to a degree within what is justified by the evaluative strength of the test sample, to ensure that the classifier 407 is not overly tuned to any particularities of the specific content of the test sample.

Figure 5:
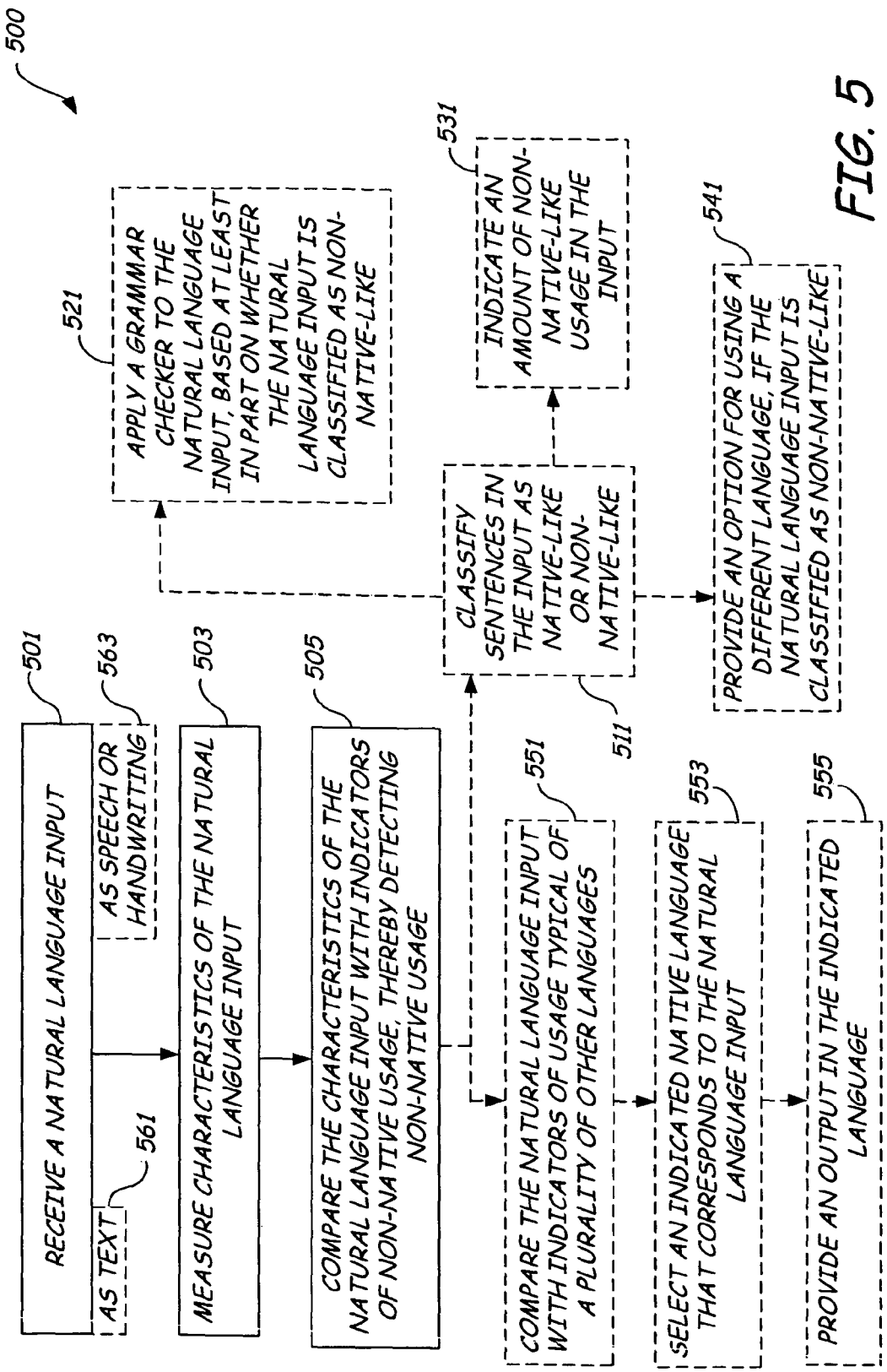
FIG. 5 depicts a flowchart of a method providing an illustrative embodiment of a language usage classifier.

FIG. 5 depicts a flowchart of a method 500 according to another illustrative embodiment. Method 500 may also be implementable at least in part by a computing device, such as computing devices 110, 180, 201, 224, and 226 of FIGS. 1 and 2, for example. Method 500 includes step 501, to receive a natural language input; step 503, to measure characteristics of the natural language input; and step 505, to compare the characteristics of the natural language input with indicators of non-native usage, such as the indicators of non-native usage applied by classifier 407 of FIG. 4, for example, which may be produced by measuring characteristics of an original corpus.

Method 500 may also include any of a large number of optional steps, such as the illustrative examples of steps 511, 521, 531, 541, 551, 553, 555, 561, and 563 depicted in dashed lines in FIG. 5, any of which may be used individually or in combination with steps 501, 503 and 505, in different embodiments. These steps are illustrative of a variety of other aspects and variations that can be used with method 500 in different embodiments.

Step 511 is for indicating one or more sentences in the natural language input to be either native-like or non-native-like. The input is indicated to be non-native-like if the characteristics of the natural language input meet a selected threshold of similarity to the indicators of non-native usage; or native-like, if the characteristics of the natural language input do not meet the selected threshold of similarity to the indicators of non-native usage. Step 511 corresponds to a feature illustratively further described with reference to FIG. 6 below.

FIG. 5 depicts step 521 as another option, to apply a grammar checker to the natural language input, wherein the grammar checker provides output based at least in part on whether the natural language input is indicated to be non-native-like. In this illustrative embodiment, the classifier is used as a filter for a grammar checker tool, so that the determination of whether a text is indicated as non-native usage or native usage will be incorporated in the behavior of the grammar checker. For example, it may engage a more aggressive grammar checking mode if non-native usage is indicated, flagging grammatical constructions and offering suggested changes whenever they are potentially erroneous, to help ensure that the non-native user gets the additional help she needs; or a less aggressive grammar checking mode if native usage is indicated, to reduce the number of false flags for a native user who may correctly employ exceptions to grammatical rules or minority usages, which would likely indicate error when produced by a non-native speaker.

As another example, the language usage classifier may indicate a likely native language of the user, and the grammar checker is then engaged in a mode specifically geared toward native speakers of that language, and evaluating grammar and offering suggestions that may be particularly geared toward native speakers of that language. As yet another example, the grammar checker may provide alternative suggestions for grammatical usages that are correct, but that are frequently used the wrong way by non-native speakers. For example, an input text may contain a sentence that reads, "She gave me paper." A system that embodies a language usage classifier used in combination with a grammar checker could determine that non-native speakers often tend to use "paper" when "a paper" or "the paper" is what is actually intended. The system could then flag the above sentence and offer a suggestion, "Do you mean 'She gave me a paper' or 'She gave me the paper' instead?" Whereas, if the input had been previously evaluated as produced by a native speaker, the embodiment system would simply confirm the sentence as correct and move on, because it is flagged only when a non-native review mode is engaged, in response to the language usage characterizer identifying the input as non-native-type. This may also be more specifically targeted in another embodiment, for example, by determining that "a paper" or "the paper" may be offered as suggestions if the user's native language is Chinese, but not if the user's native language is French, for example.

The interface of a language usage classifier with a grammar checker may be seamlessly integrated into a word processing program, so that a user of the word processing program never needs to take any action to engage the language usage classifier other than open the word processing application and not turn the grammar checking function off. Indications of language usage may be displayed, similarly to how grammar check indications are displayed, with graphics and text within the user interface of the word processor application, in this illustrative embodiment. The language usage classifier may provide additional features within the word processing application, such as an indication of the amount or ratio of non-native-like usage is included in a text document, as in optional step 531. For example, the text may be assigned a score based on the number of sentences that have non-native properties. This score can serve as an approximation of the overall quality of the text.

In another illustrative embodiment, the language usage classifier may be used for a plagiarism detection application. For example, the language usage classifier may characterize a specific user as having non-native usage, which may remain relatively consistent over several episodes of language entry.

If the user then makes a language entry that exhibits a far lower ratio or an absence of non-native usage, in an entry sufficiently large enough to provide a meaningful sample size and after an amount of time relatively short compared to typical durations of time for someone to dramatically improve their fluency at a non-native language, a flag indicating potential plagiarism may be provided to an administrator, for example.

In yet another illustrative embodiment, the grammar checker may flag errors and offer suggestions as part of a targeted foreign language training application, that is aimed at assisting the user become more proficient in the language being used.

Another option in method 500 is step 541, to provide an option for using a different language, if the natural language input is indicated to be non-native-like. For example, in one illustrative embodiment, where a user is making language inputs in English, whether written or spoken, and a language usage classifier indicates the entries to exhibit non-native usage, this may trigger a machine to use simplified English, for example, or to automatically indicate to a human administrator or operator that the user may require special assistance, or to ask the user, "Would you like to use non-English assistance?" Another embodiment may include a variation on this in which the language inputs are spoken words, and the indicators of non-native usage include an accent typical of a particular native language; this may trigger the associated automatic speech recognition (ASR) tool to switch to a mode particularly geared toward processing language inputs by people with that particular accent, or gear grammar checking and recommendations to a native speaker of that language.

In another embodiment based on a language usage classifier that further identifies a likely native language of the user based on the peculiarities of the non-native usage, a help feature may ask the user, in the likely native language of the user, if the user would like the machine to switch to that likely native language of the user. This includes step 551, to compare the natural language input with indicators of usage typical of a plurality of other native languages; step 553, to select an indicated native language that corresponds to the natural language input; and step 555, to provide an output in the indicated language. For example, if the machine embodiment detects that the English inputs include characteristic identifiers in the English usage of a native Dutch speaker, it could be triggered to then bring up a Dutch language prompt asking the user, "Zou u in nederlands willen voortgaan?" Meaning, "Would you like to continue in Dutch?" This may also be accompanied not only by options in the newly indicated language, but also in the prior language, in case the indicated likely native language turned out to be wrong. For example, the previous Dutch language prompt may be accompanied by the Dutch language options "Ja, graag" and "Nee, bedankt" (for "Yes, gladly" and "No thanks"), and the English language option "Continue in English please". The machine embodiment may for example also ask the user, after the user confirms her native language, if she would like the machine to automatically translate other content, such as Internet content, into the user's native language.

Another aspect of method 500 is the manner in which the natural language input is received. As depicted with option 561, the natural language input may be received in the form of text. This may be text that a user enters directly, or an input that is transformed into text by an intermediate process. Another possibility in other embodiments is option 563, to receive the natural language input in a non-text format such as spoken language or written language.

A spoken language input may be entered via automatic speech recognition (ASR), for example. This may take the form of any currently known ASR system, or any new ASR system arising from ASR development that is currently, and will likely remain for some time to come, an active area of research and development. The ASR input may take the form of a user's speech being transformed into a text input, which is then handled as any other text input with method 500. In another option, the speech input itself, received via an ASR feature, may be subjected to its characteristics being measured, in step 503, and those characteristics being compared with indicators of non-native usage of the language in spoken form, in step 505.

A handwritten input can be entered with a stylus on a readable monitor, for example. Similarly to the case of spoken input, a handwritten input may have characteristics of the handwriting itself, not just of the language, measured and classified for indicators of native or non-native usage. For example, many non-native English speakers write a number "1" with a more prominent upper serif than native English speakers, simply due to different traditional handwriting practices in different parts of the world. A more prominent upper serif on a number 1 may be measured and classified as an indicator of non-native usage relative to an English-language input, in an embodiment illustrative of this feature. Many such features may be automatically measured and used by a process corresponding to architecture 400, as applied to a training data corpus 401 comprising handwritten inputs, with feature extractor 403 equipped to measure relevant characteristics of the handwriting, and use these characteristics to model classifier 407 with capacity as a handwritten language usage classifier. In another option, as with speech, a handwritten input may simply be translated into a text input by a handwriting-to-text tool, and the input only measured for characteristics of the text input, in other embodiments.

Figure 6:
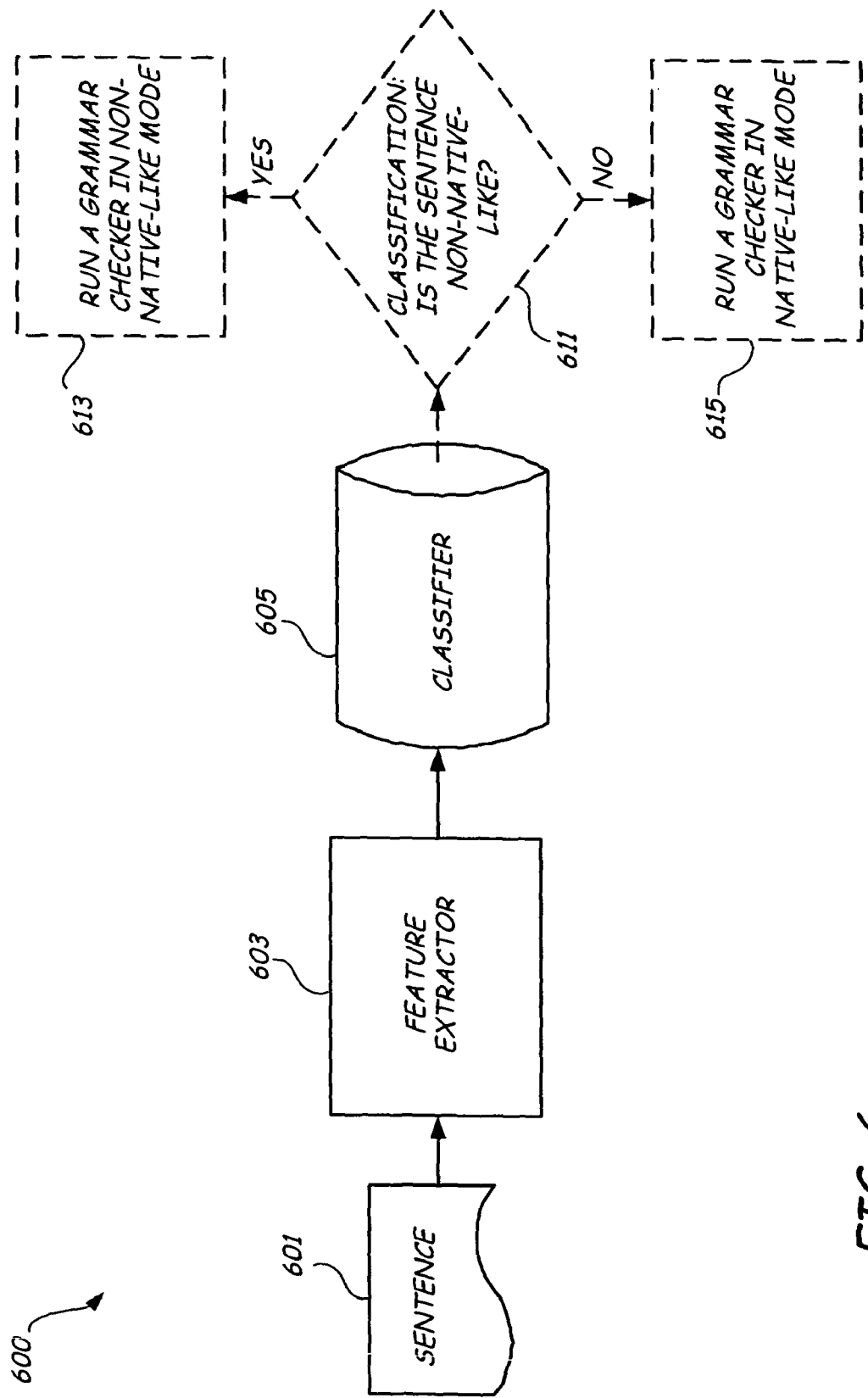
FIG. 6 depicts a block diagram of an architecture of a language usage classifier, according to one illustrative embodiment.

FIG. 6 depicts a block diagram of an architecture 600 corresponding in some respects to method 500, according to the present illustrative embodiment. FIG. 6 depicts the function of classifier 605 at runtime, after classifier 605 has been trained, and may be used to evaluate new inputs, in this embodiment. Architecture 600 includes a natural language input 601, such as a sentence, received from an outside source, such as a user. It further includes feature extractor 603, representing a feature for measuring characteristics of the natural language input. The classifier 605 then compares the characteristics of the natural language input with indicators of non-native usage. These indicators may be due to a training process such as that discussed for FIGS. 3 and 4, for example.

There are a variety of ways to measure the similarity of the input to the indicators of non-native usage. For example, a sentence may be passed into a feature extractor component 603 equivalent or similar to feature extractor 403 of FIG. 4, which was used during the training process. The sentence may be represented as a feature vector, and be passed into the classifier, which may be a support vector machine (SVM) classifier, in an illustrative embodiment. The classifier may compare the feature vector of the sentence being evaluated with the support vector machine classifier, comprising indicators of non-native usage, and determine a level of similarity between the sentence feature vector and the indicators of non-native usage. This level of similarity between the characteristics of the sentences and the indicators of non-native usage, by whatever means measured, can be evaluated relative to a selected threshold of similarity. This comparison may be used to indicate, as at decision node 611, whether one or more sentences in the natural language input is either native-like or non-native-like.

Architecture 600 may further include optional features 613 and 615, leading from decision node 611. Features 613 and 615 include applying a grammar checker on the natural language input 601 being evaluated. The grammar checker provides output based at least in part on whether the natural language input 601 is indicated to have non-native usage, by classifier 605 and as indicated at decision node 611, in this illustrative embodiment. If the input is indicated at decision node 611 to exhibit non-native-like usage, then option 613 can be engaged, to run a grammar checker in a non-native-like mode. If the input is not indicated at decision node 611 to exhibit non-native-like usage, or if it is identified as native-like usage, such as by similarity to indicators of native-like usage, then option 615 can be engaged, to run a grammar checker in native-like mode.

Figure 7:
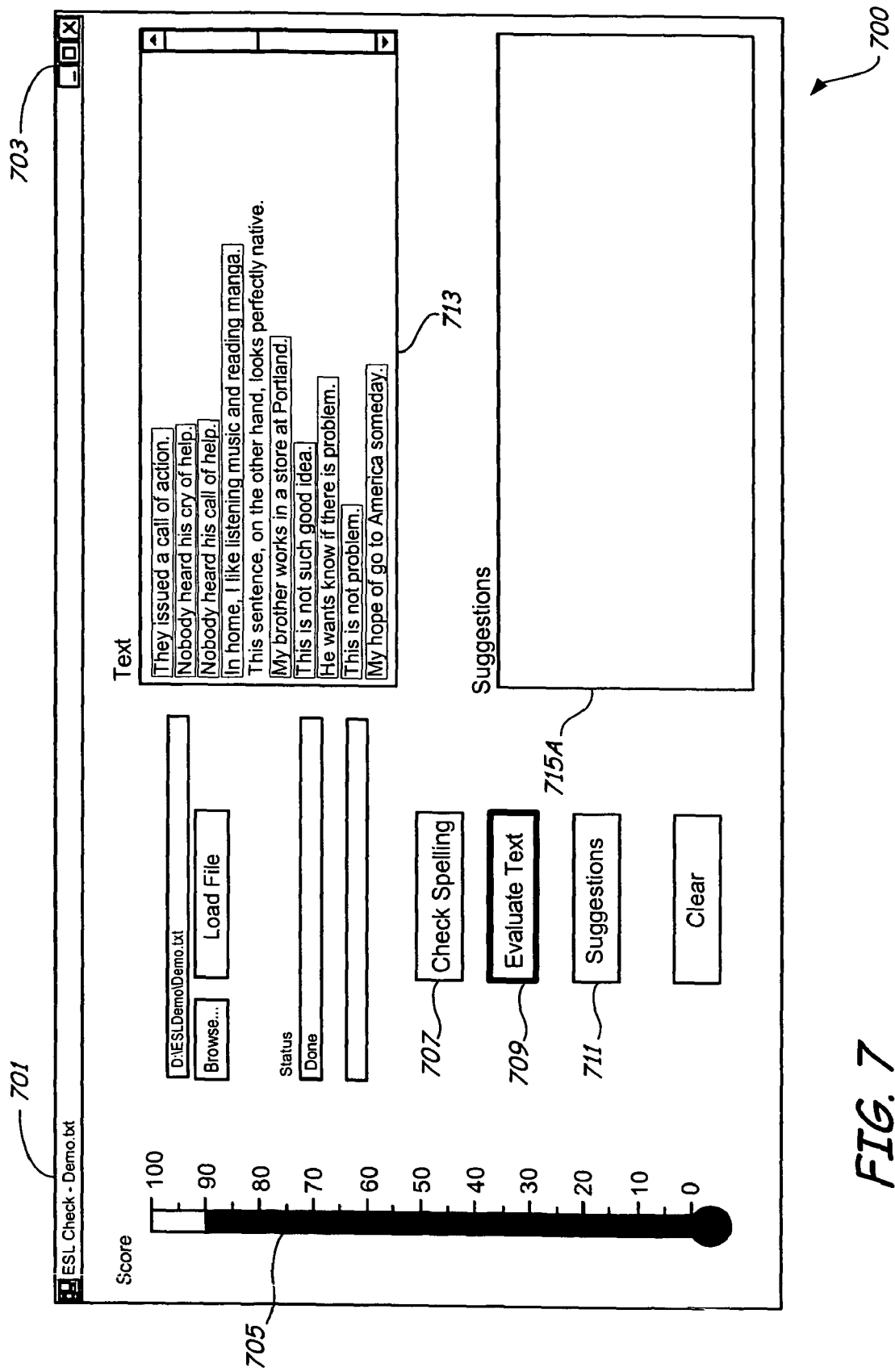
FIG. 7 depicts a user interface for a language usage classifier, according to one illustrative embodiment.
Figure 8:
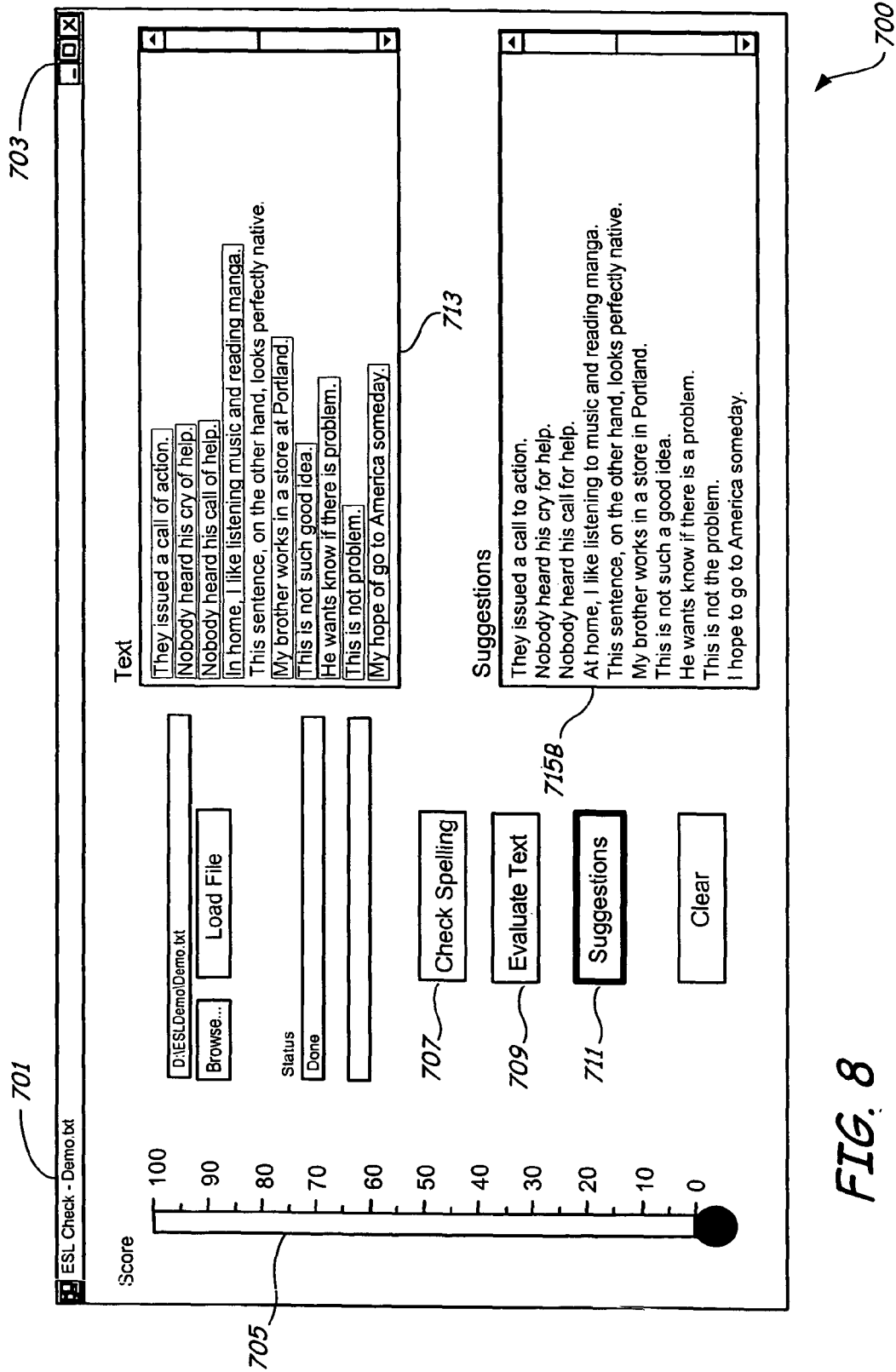
FIG. 8 depicts a user interface for a language usage classifier, according to one illustrative embodiment.

FIG. 7 depicts a user application interface 700 for an application that includes a language usage classifier, along with and a spelling and grammar checker that provides suggestions for corrected usage, as it might appear on a monitor or screen of a computing device, according to one illustrative embodiment. FIG. 8 depicts the user application interface 700 that includes the language usage classifier according to the present illustrative embodiment, after an input set has been classified and suggestions for corrected usage provided. Application interface 700 includes title bar 701 and function keys 703, as many familiar application interfaces do. Application interface 700 further includes non-native usage score indicator bar 705 for indicating a ratio of sentences in an input that are indicated to have non-native usage; spell checker button 707 for running a spell check on an input; language usage classifier button 709 for running a language usage classifier on an input; grammar checker button 711 for running a grammar check on an input and providing suggested grammatical corrections; text display 713, which displays the text of an input, with each sentence on a new line, in this display; and suggestion display 715A in FIG. 7, depicted as blank before it is used, corresponding to suggestion display 715B in FIG. 8, depicted to include suggested usage corrections.

In FIG. 7, language usage classifier button 709, labeled "Evaluate Text", is highlighted, indicating that it has been engaged as the most recent user action with the application. Engaging language usage classifier button 709 instructed the application to run a language usage classifier on a text input that had already been entered, and a sampling of which appears in test display 713. The application has used the language usage classifier to evaluate whether each sentence in the text input exhibits non-native usage or native usage, and indicates sentences to have non-native usage by highlighting them in text display 713 (as indicated here by boxes around each sentence so indicated). The application has also used the language usage classifier to measure the ratio of non-native usage sentences to total sentences in the text input, and to display this ratio, of 90% in this case, on non-native usage score indicator bar 705. The ten sentences visible in the text display 713 are therefore accurately representative of the text input as a whole, since nine out of ten of the visible sentences is highlighted to indicate non-native usage.

FIG. 8 shows suggestion display 715B as it appears after grammar checker button 711, which reads "Suggestions", has been engaged (indicated by button 711 being highlighted). The application has used a grammar checker to offer suggestions for corrected forms of the sentences in the text input. In an illustrative embodiment, the grammar checker has operated differently on each sentence, depending on whether the sentence was already indicated by the language usage classifier to have non-native usage or native usage. This may take the form of the grammar checker only providing suggestions for sentences already indicated as non-native usage; or the grammar checker using a less aggressive mode in evaluating sentences indicated as native usage, and only providing a suggested correction for those sentences where there is a clear grammatical error. This helps avoid false flags, or grammatical suggestions for grammar that might be in error based on the knowledge of the grammar checker, but that are more likely to be correct in a native usage sentence.

A variety of methods may be used for inputting text to be used by the application of application interface 700. In different embodiments, this may include copying and pasting text from another document; or pointing to a text in another application while in a language usage classifier mode, and the language usage classifier application providing popup indications or suggestions adjacent to where a cursor is rested on the text sample being evaluated; or selecting a document or a file and running the application on that document or on all the documents in that file all at once; or pressing a button and having the suggestions come up for all text within an email or a web page, for example. It may simply provide a yes-or-no indication of whether each sentence has non-native usage, or provide a graphical indication such as non-native usage score indicator bar 705 of the amount of non-native usage in a document or file, or provide a color coding on sentences indicated to have non-native usage, such as changing indicated non-native sentences to red text or putting red highlighting on them, while leaving alone those sentences indicated to have native usage.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by a computing system comprising one or more processors, the method comprising:
   receiving, using one or more of the processors, a first natural language input;
   measuring, using one or more of the processors, characteristics of the first natural language input;
   using the characteristics to train, using one or more of the processors, a first classifier for comparing the characteristics of the first natural language input with indicators of non-native usage;
   gathering additional natural language input;
   using the first classifier on the additional natural language input for indicating a portion of the additional natural language input as having non-native usage;
   combining the additional natural language input indicated as having non-native usage with the first natural language input, into a combined natural language input;
   measuring the characteristics of the combined natural language input; and
   using the characteristics of the combined natural language input to re-train the classifier, to create a refined classifier for indicating non-native usage of the language.

2. The method of claim 1, further comprising classifying one or more sentences in a new natural language input as either:

non-native-like, if the characteristics of the new natural language input meet a selected threshold of similarity, using the refined classifier, to the indicators of non-native usage; or native-like, if the characteristics of the new natural language input do not meet the selected threshold of similarity, using the refined classifier, to the indicators of non-native usage.

3. The method of claim 2, further comprising applying a grammar checker to the new natural language input, such that the grammar checker provides output based at least in part on whether the new natural language input is classified by the refined classifier as native-like or non-native-like.

4. The method of claim 2, further comprising indicating an amount of non-native-like usage in the new natural language input.

5. The method of claim 2, further comprising providing an option for using a different language, if the new natural language input is classified as non-native-like.

6. The method of claim 1, further comprising:
comparing a new natural language input with indicators of usage typical of a plurality of other native languages;
selecting an indicated native language that corresponds to the new natural language input; and
providing an output in the indicated language.

7. The method of claim 1, wherein a new natural language input is received as a spoken language input, and the method comprises measuring characteristics of the spoken language input, and comparing the characteristics of the spoken language input with indicators of non-native spoken language usage.

8. The method of claim 1, wherein a new natural language input is received as a handwriting input, and the method comprises measuring characteristics of the handwriting input, and comparing the characteristics of the handwriting input with indicators of non-native handwriting usage.

9. The method of claim 1, in which the first classifier comprises a one-class classifier, and the refined classifier comprises a two-class classifier.

10. A method, implemented by a computing system comprising one or more processors, the method comprising:
providing, using one or more of the processors, a corpus in a language by non-native users of the language;
measuring, using one or more of the processors, characteristics of the corpus;
using the characteristics to create, using one or more of the processors, a classifier for indicating non-native usage of the language;
receiving an input, and using the classifier on the input for indicating non-native usage;
adding the input indicated as non-native usage to the corpus;
re-measuring the characteristics of the corpus; and
using the re-measured characteristics to create a refined classifier for indicating non-native usage of the language;
in which at least one of the first classifier and the refined classifier is prepared by a classification algorithm that comprises a support vector machine.

11. The method of claim 10, in which the additional natural language input is gathered from the Internet.

12. The method of claim 10, wherein the characteristics measured comprise part-of-speech trigrams.

13. The method of claim 10, wherein the characteristics measured comprise parse tree segments.

14. The method of claim 10, wherein the characteristics measured comprise logical forms.

15. The method of claim 10, wherein the characteristics measured comprise lexical N-gram features.

16. The method of claim 10, wherein the characteristics measured comprise function word distances.

17. The method of claim 10, wherein the characteristics measured comprise spelling or grammar errors.

18. The method of claim 10, in which the support vector machine uses a radial basis kernel function to model properties of data.

19. A method, implemented by a computing system comprising one or more processors, the method comprising:
providing, using one or more of the processors, a corpus in a language by non-native users of the language;
measuring, using one or more of the processors, characteristics of the corpus;
using the characteristics to create a classifier for indicating non-native usage of the language;
in which the characteristics are comprised in training parameters of a classifier training process used for training the classifier, and the method further comprising:
using the classifier on a test sample for indicating non-native usage in the test sample;
evaluating which of the training parameters are effective for indicating non-native usage in the test sample; and
retraining the classifier based on the training parameters evaluated to be effective for indicating non-native usage;
in which the classifier is prepared by a classification algorithm that comprises a support vector machine.

20. The method of claim 19, further comprising:
providing a second corpus comprising revisions of at least part of the first corpus into native usage;
measuring characteristics of the second corpus; and
storing the characteristics of the second corpus as a further basis for indicating non-native usage of the language.

* * * * *